United States Patent [19]

Krüeger et al.

[11] 4,236,791
[45] Dec. 2, 1980

[54] LIQUID CRYSTAL ILLUMINATOR HAVING ELLIPOIDAL LIGHT GUIDE

[75] Inventors: Hans Krüeger; Werner Glaubitz, both of Munich, Fed. Rep. of Germany

[73] Assignee: Siemens Aktiengesellschaft, Berlin & Munich, Fed. Rep. of Germany

[21] Appl. No.: 909,553

[22] Filed: May 25, 1978

[30] Foreign Application Priority Data

Jun. 1, 1977 [DE] Fed. Rep. of Germany ........ 2724748

[51] Int. Cl.³ ............................................. G01F 1/133
[52] U.S. Cl. ................... 350/345; 350/96.15
[58] Field of Search .............................. 350/345, 96.15

[56] References Cited

U.S. PATENT DOCUMENTS

| 4,111,534 | 9/1978 | Cirkler et al. | 350/345 |
| 4,142,781 | 3/1979 | Baur et al. | 350/345 |

FOREIGN PATENT DOCUMENTS 1372868 11/1974 United Kingdom .

*Primary Examiner*—Edward S. Bauer
*Attorney, Agent, or Firm*—Hill, Van Santen, Steadman, Chiara & Simpson

[57] ABSTRACT

The invention relates to an optical element in the form of a body (fluorescent body) which comprises a material with an index of refraction greater than one, contains fluorescent particles, and manifests at least one output coupling zone (light outlet window). This element is characterized, in accordance with the invention, by its use for collecting, conducting, and focused output coupling of optical radiation. The fluorescent body primarily serves the purpose of collecting natural or artificially produced radiation in large areas, and to focus it on a small-area, relatively weak receiver; or, with and without a light valve, for the purpose of representation of information (or data).

1 Claim, 10 Drawing Figures

LIQUID CRYSTAL ILLUMINATOR HAVING ELLIPOIDAL LIGHT GUIDE

BACKGROUND OF THE INVENTION

Copending U.S. patent application Ser. No. 881,043 filed Feb. 24, 1978 (which corresponds to German Offenlegungsschrift P 27 12 325) describes an optical display element in the form of a preferably plate-like body (fluorescent body) which is made of a material having an index of refraction of greater than one, contains fluorescent particles, has an at least partially reflective surface and bears a character, symbol or the like which optically contrasts with the background, and which is formed by appropriately shaped output coupling zones ("light outlet windows") of the fluorescent body.

In a very simple structure, a display of this kind provides a contrast which is uniformly high and is independent of environment, can easily be read even from oblique directions, and, if an additional illumination source is provided, consumes only a small quantity of power.

SUMMARY OF THE INVENTION

It has been found that a fluorescent body as described in the preceding section provides advantages not only in association with the optical representation of data, but quite generally speaking can be used whenever optical radiation is to be collected, conducted, and concentrated at specific points, i.e., output coupled. Thus the body can be used, for example, to intercept natural or synthetically produced radiation over a large area and to focus the latter onto a small area, relatively weak receiver. It is unnecessary for the excitation and emission radiation to lie in the visible frequency range; the fluorescent body can operate equally well in ultraviolet or in close or remote infrared.

It has also been established that the fluorescent body, independently of the discovered possibilities of use, from a structural viewpoint is not required to possess all the features quoted in the aforementioned copending U.S. patent application in order to be able to fulfill its function. Thus, it is possible to dispense with surface reflection when a suitable body shape is selected; furthermore it is not always necessary to provide the body with a character, symbol or the like which optically contrasts with the background.

For this reason, in a generalization of the solution principle on which the referenced copending U.S. patent application is based, an optical element in the form of a body (fluorescent body) which is formed of a material having an index of refraction of greater than one, contains fluorescent particles, and possesses at least one output coupling zone ("outlet window"), in accordance with the copending U.S. patent application, is characterized in accordance with the invention by its use for the interception, guidance, and focused output coupling of optical radiation.

The invention exploits the fact that as a result of spatial focusing and possibly also displacement and compression of the excitation frequency band, the fluorescent body becomes a highly effective "compressor" which re-emits the intercepted radiation with increased intensity. The fact that a major part of the radiation which enters the body remains in the interior of the body and reemerges only at the points provided for this purpose, is fundamentally due to the fact that the light which has been fluorescence-scattered and then intercepted by means of (total) reflection, is only after a relatively long distance once more absorbed by the fluorescent particles and then is possibly scattered outwards. The fact that the fluorescent light has a finite, free path length is associated with the fact that with the fluorescent materials which have hitherto been used, the frequency ranges for absorption and emission partially overlap, so that it is not possible to avoid a certain self-absorption.

Investigations have indicated that a plate-like fluorescent body is in no way always optimal. If the body serves for example to intensify the brightness of a display arranged in front of it, and if this body is allowed to project laterally beyond the display in order to form collector surfaces, the intercepted light will in part have to cover a very long path before it reaches the output coupling windows located behind the display; therefore it will experience a noticeable weakening as a result of self-absorption. Therefore frequently the amplification factor can be increased by modifying the plate form to have two plane-parallel base surfaces and reflective side surfaces which are preferably at right angles to the base surface and the base surface has the shape of a polygon such as a rectangle or triangle. The design is governed by the position of the collector surfaces relative to the output coupling zones.

The influence of the extremely disturbing self-absorption can also be considerably reduced by providing the fluorescent plate, which preferably has the following structure: the plate is composed of two layers I and II, layer I containing fluorescent particles in the correct concentration, and layer II consisting of a material having the same or approximately the same index of refraction and a very low degree of attenuation for the emission wavelength of the fluorescent plate. Layer II can then contain the light outlet windows (grooves). The layer with the fluorescent substances can also be designed in such manner that the fluorescent particles are uniformly orientated therein. In this case a polarized emission of fluorescent light can take place. In addition to a two-layer version, multi-layer arrangements are of course also conceivable. If in this case glass is used for example for the uppermost layer, a particularly weather resistant embodiment is obtained.

A further possibility of reducing the self-absorption consists in providing that at least two fluorescent plates with different fluorescent substances are connected in series or are placed one against another. In this case the self-absorption in the plate II for the fluorescent light of the plate I should be very low.

Instead of modifying the basic plate form, an entirely different three-dimensional form could be adopted: a - preferably hollow - ellipsoid of revolution. Under certain circumstances an ellipsoid of this type need not be reflective at all. This applies in particular when it contains a synthetic light source. The precise design is fundamentally dependent upon the self-absorption of the fluorescent body, upon the nature and position of the outlet windows, upon the location of the light source and possibly also upon the shading produced by a display placed in front, and should be optimized in accordance with the individual circumstances. A rotation-symmetrical, edge-free form not only entails production simplifications, but doubtless is also aesthetically pleasing.

An aesthetic effect can also be achieved with a fluorescent body designed to have two plane-parallel base surfaces and reflective side surfaces which extend at right angles to the base surface. In addition, a form of this type is also favorable technically speaking; in particular, a relatively high degree of amplification is achieved with a small quantity of material.

In many cases, for example in the case of portable, battery-fed display instruments, such as wristwatches, as space saving as possible a design of the display unit consisting of fluorescent body and display is required which is also to possess a pleasing front side. These requirements can be fulfilled with the following configuration: in a plate- or disc-shaped fluorescent body, a part of the basic area is set back, maintaining the body thickness. The space formed in this way accommodates the display. Expedient embodiments of a bowl form of this type, which economizes on material, allows space for drive components, and still possesses a minimum collector surface even when it is inlet into a housing.

A particularly sturdy bowl variant is obtained if the bowl edge is omitted, so that the transverse dimensions of the unit are virtually determined by the display area of the display. A shaping of this type is possible even in the case of a fluorescent body arranged in a housing and having no additionally illumination means, and in fact when the display, in the reset state, allows the excitation light to pass and blocks the fluorescent light. If the display is operating for example in accordance with the principle of the so-called "rotary cell", frequency and-/or location selective polarizers would have to be used. A particularly elegant solution consists in assembling the hollow fluorescent body with a liquid crystal cell of the dynamic scattering type, in such manner that an enclosed light conductor system is formed which holds intercepted excitation light in the rest state of the display and allows it to re-emerge frontwards only by scattering at driven (dynamic scattering) display zones.

In the aforegoing, fundamentally only the various body forms which an optical element in accordance with the invention can assume have been dealt with. In the following, the window design will be discussed which can vary considerably in accordance with the purpose of use. Expedient designs for the production of a predetermined main output coupling direction which for example is oblique to the plane of a fluorescent plate, or for the formation of a parallel bunch of beams are characterized by windows having angled reflection surfaces and by windows with lens. Independently of the function assigned to the window, it is advisable to adapt the window dimensions to the body dimensions since, on account of the unavoidable self-absorption, each output coupling zone should be hit by the light entering the interior of the body even after a relatively short distance. Thus, for example, in the case of a relatively thick fluorescent plate, the windows must also comprise a comparatively large area, and thus, as grooves, must possess a great penetration depth; the light then inevitably emerges on a wide front. The use of two plates with each plate having grooves to form windows indicate how both narrow and wide output coupling can be achieved from a fluorescent plate, and how a wide beam outlet can be achieved even with a thin fluorescent plate.

The proposed optical element can furthermore not only be used in various types of functions, three dimensional forms and window types, but can also be constructed with different carrier materials provided these have an index of refraction of greater than one and can dissolve suitable fluorescent substances. Thus, for example, in addition to solid materials with or without a preferred direction of the embedded fluorescent particles, it is also possible to use liquid carriers. If, for example, a liquid having a very high index of refraction is selected for this purpose, on account of the small limiting angle, a very large proportion of the fluorescence-scattered light remains in the body. Liquid crystals prossess a very high optical density, and furthermore, if their molecules, and thus also the added fluorescent particles, are pre-orientated in a suitable manner, supply polarized fluorescent light.

Other advantageous embodiments and further developments of the invention form the subject of further claims.

The invention will now be explained in detail on the basis of preferred exemplary embodiments, making reference to the attached sheets of drawings. In the individual Figures of the drawings, components corresponding to one another have been provided with similar reference characters.

Other objects, features and advantages will be apparent from this detailed disclosure and from the appended claims.

DETAILED DESCRIPTION

In all the exemplary embodiments, the fluorescent body serves for the passive brightness intensification of a display in the form of a digit display on a liquid crystal base. In the schematic illustrations, all those parts of a display which are not absolutely necessary to enable the invention to be understood, for example electric supply lines, drive components, holders, light sources or any absorption foils which may be required behind the display unit, have been omitted.

Figure 1:
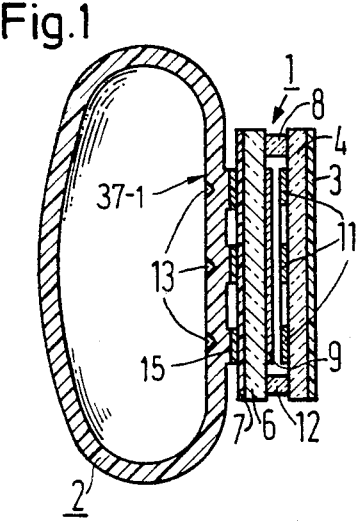
FIG. 1 illustrates a first exemplary embodiment in a vertical sectional view.

The liquid crystal display in FIG. 1 consists of the actual cell 1 and a fluorescent body 2 which is arranged behind the cell in the direction of observation. The cell contains, arranged in series in the direction of observation, a front linear polarizer 3, a front carrier plate 4, a rear carrier plate 6 and a rear linear polarizer 7 which is parallel to the front linear polarizer 3. The two carrier plates 4 and 6 are maintained at a distance from one another by a spacing frame 8, and on their inner surfaces which face one another each bears a conductive coating (i.e. a throughgoing rear electrode 9, and a front electrode composed of individual segments 11). The chamber delimited by the frame 8 and the two carrier plates 4 and 6 is filled with a liquid crystal substance 12. The cell operates in accordance with the principle of the so-called "rotary cell", and further production and operating details can be gathered from British Patent Specification 1,372,868 which corresponds to German Offenlegungsschrift No. 21 58 563.

In the present case the fluorescent body has a form which is similar to that of a hollow ellipsoid of revolution, of which the zone covered by the cell is flattened and provided with light outlet windows in the form of grooves 13 and scatter surfaces 15. The scatter surfaces are raised and contact the cell so that the two parts form an optical contact only at small areas. The grooves 13 are each arranged behind one of the electrode segments 11. The top surface of the ellipsoid is at no point reflective. The optimum body shape can be determined empirically or by computer, under predetermined limiting conditions. It will be discovered that the most favorable form of a rotation ellipsoid, in a geometrically strict sense, can in fact vary within specific limits.

Figure 2:
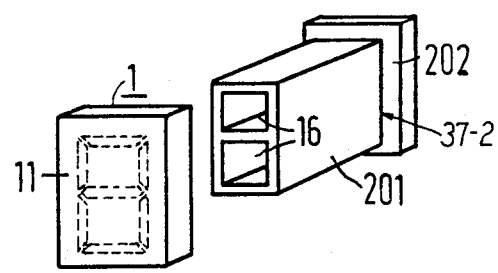
FIG. 2 illustrates a second exemplary embodiment in a disassembled, perspective view.

The design in FIG. 2 contains two fluorescent bodies. The one body (first fluorescent body 201) which is arranged directly at the rear of the display, possesses, in the display plane, a profile which reproduces the sum of all the operable display zones; in the present example the form of the digit "8" (rectangular outline with two rectangular openings 16). The other body (second fluorescent body 202) is plate-shaped and closes off the first body at the rear.

Figure 3:
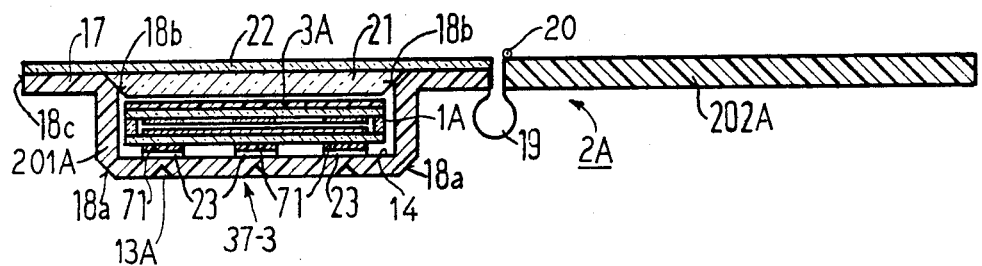
FIG. 3 illustrates a third exemplary embodiment in a transverse sectional view.
Figure 4:
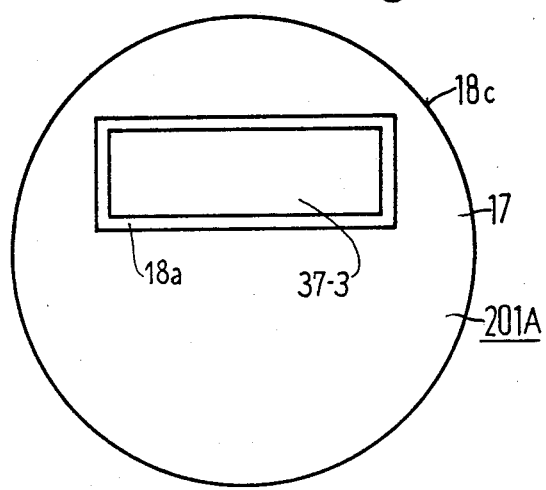
FIG. 4 illustrates the exemplary embodiment of FIG. 3 in a front view.

FIGS. 3 and 4 show a design which is intended as wristwatch display. The design includes a liquid crystal cell 1A and a fluorescent body system 2A. The liquid crystal cell is arranged in the interior (recess 14) of a bowl-shaped fluorescent body 201A, the sidewalls of which—forming an edge 17—are bent over outwards. The outer edges formed by the sidewall and the base and by the sidewall and the edge 17 are beveled, and together with the outer peripheral surface of the edge 17, are provided with reflective layers 18a, 18b, 18c. In this way, the light which hits the broad surfaces of the edge 17 from the front is accumulated and conducted behind the display. If the liquid crystal cell is also designed in such manner that in the rest state it is transparent for the excitation light, but is opaque in respect of the fluorescent light, relatively large collector areas are obtained. The image brightness could also be further increased if, as illustrated, the bowl is connected to a further fluorescent body 202A via a light conductor 19. This second body 202A could be rotatably mounted by means such as a hinge 20 and in the normal position lie above the front side of the display unit; it would then have to be turned up to enable the watch to be read.

The interior of the bowl 201A receives a glass or fluorescent plate 21 which is flush with the broad surfaces of edge 17 at the front. The plate 21 is held by a glass diaphragm (diaphragm 22) which covers the plate and the edge 17 of the bowl.

If the display is provided with a throughgoing polarizer (such as polarizer 7 of FIG. 1) the cell could be directly glued to the base of the bowl if an intermediate foil having an index of refraction close to one is inserted between the two components. With a base covering of this type, there is no fear of undesired emission of light outside of the output coupling zones such as indicated at 13A. Frequently however it is more favorable for the rear linear polarizer not to be throughgoing but merely to cover the output coupling zones (polarizer segments 71) and to be glued to the fluorescent body 201A (adhesive layer 23). In this case the alignment of the liquid crystal cell relative to the fluorescent body presents no difficulties. Furthermore, the segments automatically produce a spacing of a fraction of a millimeter (mm) between the bowl base and the display which on the one hand prevents an undesired optical contact between the two components and on the other hand virtually does not reduce the light yield and the observation angle range. To this may be added the fact that the adhesive layer 23 can simultaneously serve as salient scatter plane of the relevant output coupling zones. If the polarizer segments 71 are also glued to the display, it is possible to avoid further, unnecessary reflection losses.

The front linear polarizer 3A of the described embodiment preferably consists of a throughgoing foil and is preferably designed to be frequency selective.

Figure 5:
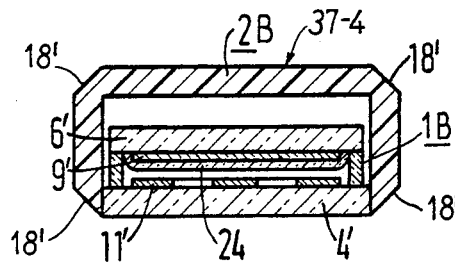
FIG. 5 is a transverse sectional view illustrating a fourth exemplary embodiment.

In the design illustrated in FIG. 5, a liquid crystal cell 1B of the dynamic-scattering type is inlet into a hollow fluorescent body 2B. In the present case, the shape of the body is such that it is supplemented by the front carrier plate 4' of the liquid crystal cell—the front carrier plate is somewhat greater than the rear carrier plate 6'—to form a hollow parallelipiped. The outer edges of this parallelipiped are beveled and reflective as indicated by the designation 18', FIG. 5. An enclosed light conductor system is formed which allows intercepted radiation to re-emerge (fundamentally frontwards) only when it is scattered at driven, i.e. dynamic-scattering liquid crystal zones. In the example, the front side of the rear carrier plate 6' in addition to electrode 9' is additionally coated with a frequency selective, dielectric multiple layer ("dielectric reflector" 24), which is transparent to excitation light, but reflects fluorescent light, i.e. imprisons it in the optical system.

Figure 6:
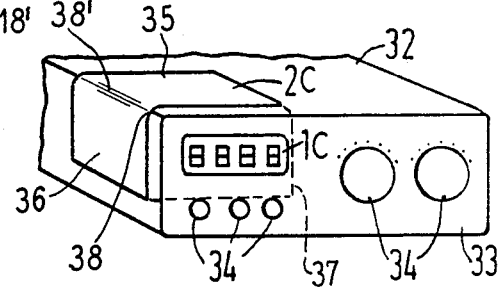
FIG. 6 illustrates an exemplary embodiment in a perspective view.

The embodiment in FIG. 6 is a display instrument comprising a housing 32, a front side 33, and a display 1C, inset into the front side, and various operating elements which have merely been indicated in the Figure and collectively referenced 34. In this instrument, a part of the fluorescent body 2C forms part of the instrument housing 32. The body has the shape of three plates 35–37 which are at right angles to one another and abut at a common corner 38; in the perspective illustration, only those plates (35 and 36) which are directly integrated into the external surface of the housing are visible.

In the present case, the outer edge 38' between the two visible plates 35 and 36 is not beveled and reflective, but is rounded off. If the relation $$R \geq \frac{dn_f}{n_f - n_a}$$

is considered, (R is the radius of curvature of the rounding d, is the plate thickness, $n_f$ is the index of refraction of the fluorescent plate, $n_a$ the index of refraction of the space external to the plates 35, 36, thus one in the case of air), the intercepted light is conducted even without a reflective layer, solely as a result of total reflection, virtually loss-free into the particular adjacent plate which leads away at a ninety degree (90°) angle. The inner edge joining plates 35 and 36 with plate 37 can likewise be rounded and meet the above criterion for total internal reflection of light to be transmitted from plates 35 and 36 to plate 37, without the use of reflectors.

It is advisable to integrate the fluorescent body into a housing in particular when the instrument is to be particularly compact and/or is to possess large collector surfaces fitted into the structural form.

Plate 37 may have coupling to display 1C as illustrated at 37-1, 37-2, 37-3 or 37-4 in FIGS. 1-5, and may further utilize one or more of the features of FIGS. 7-10.

FIGS. 7 to 10 show respective plate-like fluorescent body systems 2-1 through 2-4 having outlet windows in the form of grooves 13-1 through 13-5 of special design which are applicable to each of the preceding embodiments.

Figure 7:
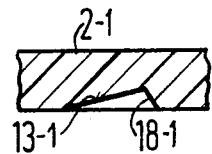
FIGS. 7, 8, 9 and 10 each shows a partial sectional view of a fluorescent body in accordance with a respective further exemplary embodiment.

In FIG. 7 the profile of the groove 13-1 with reflecting layer 18-1 is asymmetrical; it forms a rectangular groove with triangular cross section, (the triangle in cross section having unequal flanks) having a main radiation direction leading toward the upper right.

Figure 8:
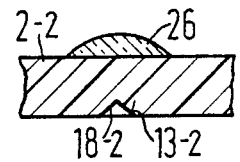

In the embodiment shown in FIG. 8, a collector lens 26 on the front side of the body 2—2 and a groove 13-2 with reflective layer 18-2 introduced into the rear of the body at the focal point of this lens ensure that the output coupled light is a parallel bunch of beams emerging at right angles to the plate plane. An emission of this type produces a particularly high multiplex ratio in a matrix-addressed display.

Figure 9:
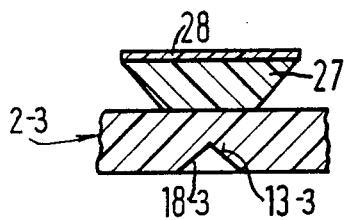

On its rear side, the fluorescent plate 2-3 in FIG. 9 contains a small groove 13-3 with a reflective layer 18-3, and on its front side, arranged in front of the groove, a projection 27 which is provided on its front surface with a light-scattering area 28. The component 27 is either moulded onto the plate or firmly attached thereto, and can consist of the same material as the fluorescent plate. The variant illustrated in the Figure ("thin plate with projections") is particularly suitable for large-area display devices as it produces high-contrast, wide output coupling areas with a small use of material.

Figure 10:
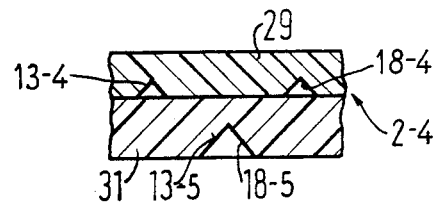

In the modification illustrated in FIG. 10, the fluorescent body 2-4 consists of two plates arranged one above another, a thin plate 29 and a thick plate 31. On their rear sides, the plates are respectively provided with grooves 13-4 and 13-5 having reflective layers 18-4 and 18-5; and in fact the plate 29 which lies at the front in the direction of view is provided with small grooves 13-4 and the rear plate 31 with deep, wide grooves 13-5. In this way it is possible to represent narrow and wide symbols with a high degree of contrast, as the radiation which penetrates into the plate hits the grooves even after a short distance.

SUMMARY OF THE DISCLOSURE

In each of the embodiments there is shown a fluorescent body which includes a base portion (37-1 through 37-4, for example) with two plane-parallel base surfaces. Each of the embodiments is further provided with a second body portion used, for example, to intercept natural or synthetically produced radiation over a large area in relation to the area of the base surfaces and to focus the latter onto a small-area, relatively weak receiver such as one, FIGS. 1 and 2, or 1A through 1C, FIGS. 3 through 6. It is unnecessary for the excitation- and emission-radiation to lie in the visible frequency range; the fluorescent body can operate equally well in ultraviolet or in close or remote infrared. Each fluorescent body system may be of configuration and/or provided with reflective layers so that a major part of the radiation which enters the body system remains in the interior of the body system and re-emerges only at the output coupling zones provided for this purpose.

In the case where the base surfaces of the first fluorescent body portion such as indicated at 37 and 37-1 through 37-4 are in the form of a polygon, for example a rectangle, the side or edge surfaces which are, for example, at right angles to the base surfaces may have reflective coatings thereon (e.g. FIG. 2). The base surfaces may also have the form of a rectangle with at least one cut-off corner (e.g. corners 18A, FIG. 3, and 18', FIG. 5) or may have rounded-off corners (e.g. as at 38', FIG. 6). The base surfaces may have the form of triangles. In such cases, frequently the amplification factor can be increased, the design being governed by the position of the collector surfaces which in general are joined integrally with the base by means of one or more bends (FIGS. 1, 3, 5 and 6). In each of the embodiments just discussed, the fluorescent body system can be composed of plates with two layers I and II, layer I containing fluorescent particles in the correct concentration, and layer II consisting of a material having the same or approximately the same index of refraction and a very low degree of attenuation for the emission wavelength of the fluorescent plate. Layer II which corresponds to the base portion of the embodiments then contains the light output windows as represented by grooves 13, 13A, and 13-1 through 13-5. The auxiliary or collector fluorescent body portions integrally connected with the base portion and forming layer I with the fluorescent substances can also be designed in such manner that the fluorescent particles are uniformly orientated therein. In this case a polarized emission of fluorescent light can take place. In addition to a two-layer version, multi-layer arrangements are of course also conceivable. If in such cases glass is used for example for the uppermost layer (FIG. 3), a particularly weather resistant embodiment is obtained.

A further possibility of reducing the self-absorption consists in providing that at least two fluorescent plates are connected in series (FIG. 3) or are placed one against another (FIG. 10). In this case the self-absorption in the plate II (e.g. plate 37-3, FIG. 3 or plate 29, FIG. 10) for the fluorescent light of the plate I (e.g. plate 202A, FIG. 3, or plate 31, FIG. 10) should be very low.

Instead of modifying the basic plate form, an entirely different three-dimensional form can be adopted: a preferably hollow ellipsoid of revolution such as indicated at 2 in FIG. 1. Under certain circumstances an ellipsoid of this type need not be reflective at all. This applies in particular when it contains a synthetic light source, for example within the hollow space of body 2, FIG. 1. FIG. 1 illustrates a body 2 of generally rotational-symmetrical, edge-free form.

FIG. 2, for example, illustrates a fluorescent body (e.g. body 201) with plane parallel base surfaces and reflective side surfaces which are at right angles to the base surfaces, the base surfaces fundamentally covering only the switchable display zones of display 1.

FIG. 5 illustrates a bowl variant where the transverse dimensions of the unit are virtually determined by the display area of the display 1B. In this embodiment, cell 1B can be a liquid crystal cell of the dynamic-scattering type, such that an enclosed light conductor system is formed which holds intercepted excitation light in the rest state of the display and allows it to re-emerge frontwards only by scattering at driven (dynamic-scattering) display zones. In this embodiment, the front carrier plate 4' of the liquid crystal cell (1B) is applied opposite to the bowl base 37-4 and covers the interior of the bowl and is in optical contact with the body 2B. The rear carrier plate 6' of the liquid crystal cell bears a frequency selective reflector 24 which allows through the excitation light for the fluorescent particles but absorbs the fluorescent light.

The disclosure of said copending application Ser. No. 881,043 filed Feb. 24, 1978 is incorporated herein by reference as disclosing further details which may be applied to each of the embodiments herein; for example, the details of material selection, additional illumination source, electrically controlled crystal cell configurations, and frequency selective dielectric reflectors.

It will be apparent that many modifications and variations may be effected without departing from the scope of the novel concepts and teachings of the present invention.

We claim as our invention:

1. An optical element comprising a fluorescent body system which is made of a material having an index of refraction of greater than one, has the form of a hollow ellipsoid of revolution, contains fluorescent particles and possesses at least one output coupling zone, said body system having at least two integral fluorescent body portions with one of the body portions having the output coupling zone, the remaining body portions being offset from the one body portion and being interconnected thereto by a smooth curved surface, said remaining body portions being operable for the interception of incident radiation remote from said coupling zone and for the guidance of resultant optical radiation to said output coupling zone.

* * * * *